June 15, 1926.
R. W. COUSINS
RELAY
Original Filed Nov. 25, 1921
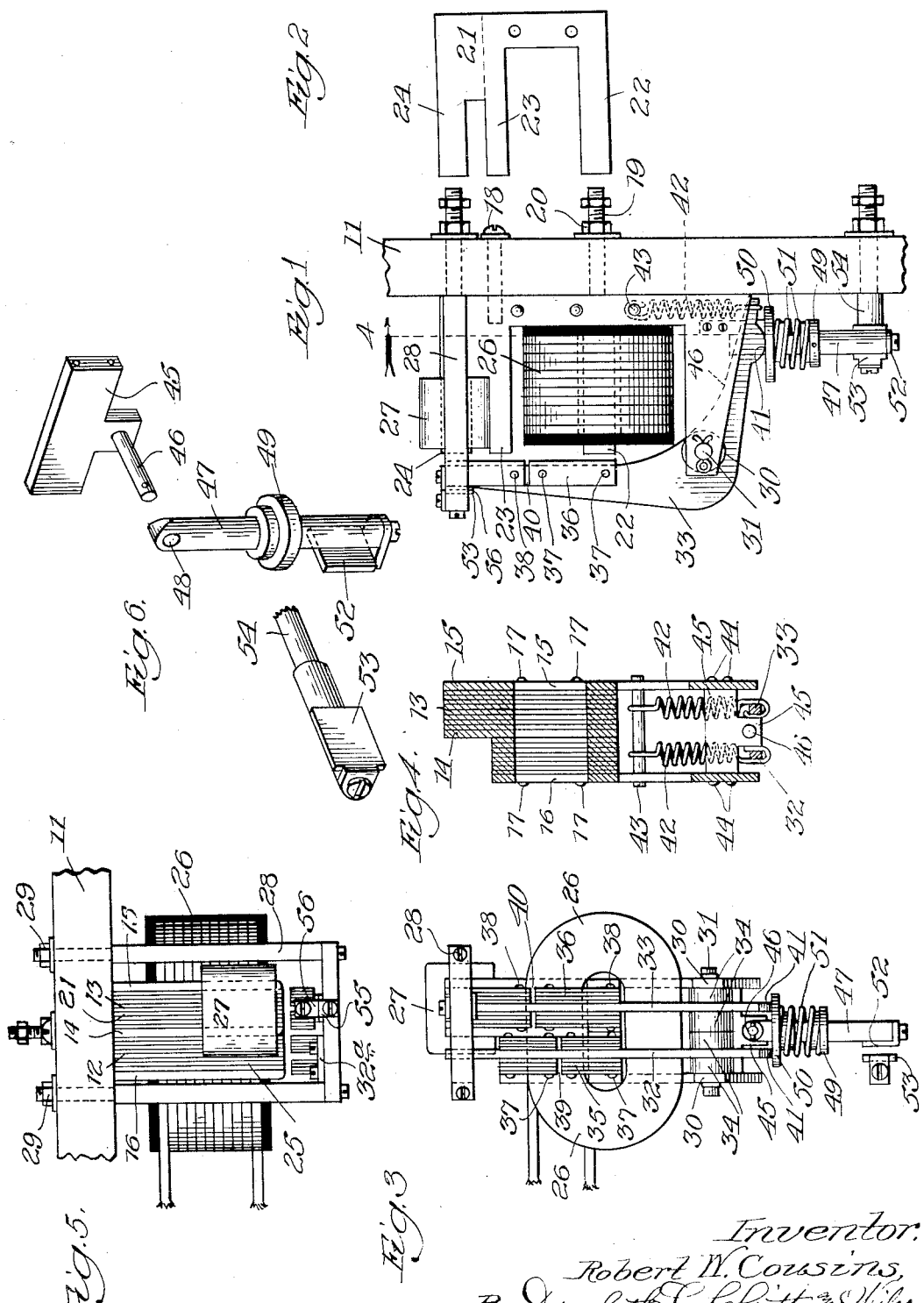
Inventor:
Robert W. Cousins, Patented June 15, 1926.

1,589,055

UNITED STATES PATENT OFFICE.

ROBERT W. COUSINS, OF GARY, INDIANA.

RELAY.

Original application filed November 25, 1921, Serial No. 517,544. Divided and this application filed January 29, 1923. Serial No. 615,625.

My invention relates to relays to be used more particularly as elements of starting mechanisms for electric motors and involving a plurality of resistance units, or sections, to be automatically cut out of the motor circuit, in succession, to supply to the motor, when all of the resistance units, or sections, are cut out the desired amount of current for operating the motor, with the desired accelerations, the subject matter of the present application being divided out of my pending application for United States patent on starting apparatus for D. C. motors, Serial No. 517,544, filed November 25, 1921.

My primary object is to provide a novel, simple and positively-operating construction of relay and one which shall be peculiarly adapted for incorporation with other elements to provide starting mechanism for electric motors functioning automatically to cut out, in succession, to effect the desired quick starting of the motor, all of the resistance units, or sections, in the motor circuit, regardless of the failure of the motor to start and regardless of the loads imposed on the motor during any of its periods of acceleration; and other objects as will be manifest from the following description.

Referring to the accompanying drawings: Figure 1 is a broken view in side elevation of the relay. Figure 2 is a face view of one of the several similar laminations forming a part of the core of the relay. Figure 3 is a front view of the construction shown in Fig. 1. Figure 4 is a section taken at the line 4 on Fig. 1 and viewed in the direction of the arrow. Figure 5 is a plan view of the relay; and Figure 6 a perspective view of the members forming the lower portion of the relay and involving contact elements, these various parts being shown in disassembled, yet related condition.

The supporting plate, or board, of the relay, is represented at 11 and supports the operating parts of the relay. The core of the relay is formed of two groups, or sections, 12 and 13, of laminations in the form of sheets of soft iron, these two groups of laminations being divided by a plate 14 and flanked at opposite sides thereof by plates 15 and 16, these various laminations and plates being rigidly secured together as by means of the rivets represented at 17. The core-structure thus provided is secured against the face of the board 11, as by means of the screw 18 which passes through this board and screws into the core-structure referred to, and by means of the threaded stud 19 projecting rearwardly from said core-structure through an opening in the board 11 and clamped in position by the nut 20. The laminations of the section 13 thereof, these laminations being represented at 21, are preferably of the form shown in Fig. 2, which may be produced by milling out the sheets to provide the three legs 22, 23 and 24; the laminations of the section 12, represented at 25, being of the same shape and form as the laminations 21, except that the portions thereof above the plane of the upper surface of the leg 23 is omitted, the plates 14 and 15 being of the same form as the laminations 21 and the plate 16 of the same form as the laminations 25. The leg thus provided by the portions 22 of the laminations 21 and 25 and the similar portions of the plates 21, supports a coil 26 of insulated wire, and the leg formed by the portions 24 of the laminations 21 and the similar portions of the plates 14 and 15 supports a shading coil 27 consisting of a solid spool of copper, containing an opening therethrough at which it surrounds the leg portion last referred to. The relay also comprises a yoke-frame 28 rigidly connected at its ends with the board 11, as through the medium of the nuts 29, this yoke partially surrounding the upper end of the laminated core-structure referred to. The plates 15 and 16 extend below the coil 26 and provide the forwardly projecting spaced-apart arms 30 in which a cross-shaft 31 is secured, this shaft having journaled thereon armatures comprising, respectively, lever arms 32 and 33, these arms being spaced apart and spaced from the plates 30 by spacers 34 surrounding the shaft 31. The arms 32 and 33 at their upper ends are of laminated construction, the laminations on the arm 32 being represented at 35, and those on the arm 33, at 36, the laminations of these respective arms being located at opposite sides of the arms and rigidly secured thereto, as through the medium of the rivets 37 and 38. The laminations 35 oppose the outer ends of the pole-pieces formed by the legs 22 and 23, these laminations being formed in sections to provide the gap 39; and the laminations 36 oppose the pole-pieces formed by the leg portions 22, 23 and 24, these laminations being formed in sections to provide the gap 40. The arms 32 and 33 are of bell-crank form and engage the shaft 31 at their angles, the lower surfaces of their rearwardly-extending ends being rounded as represented at 41. The armature-structures thus provided, for cooperating with the poles afforded by the leg portions 22, 23 and 24, as stated, are normally held in spaced relation to these poles, as shown in Figs. 1 and 5, by means of coil springs 42 one for each of the armatures, these springs being connected at their lower ends with the rear ends of the arms 32 and 33, respectively, and at their upper ends with a cross-pin 43 secured in the plates 15 and 16. Positioned between the plates 15 and 16 to extend crosswise thereof and secured thereto, as by screws 44, is a plate 45 of T-shape, from the lower end of which a pin 46 forwardly extends, this pin forming a pivotal support for a depending rod 47 journaled on the pin 46 at an opening 48 in the rod. The rod 47 is provided with a stepped-disk 49 rigidly secured thereto below the pivot-pin 46, and with a second stepped-disk 50 surrounding the rod 47 above the disk 49 and freely movable up and down on the rod 47, except as restrained by a coil spring 51 surrounding the rod 47 and the reduced portions of the disks 49 and 50, and bearing at its ends against the enlarged portions of these disks, this spring operating to yieldingly force the disk 50 against the curved portions 41 of the arms 32 and 33. The lower end of the rod 47 is provided with a contact 52, which opposes, and cooperates with, a contact 53 carried on the outer end of a rod 54 rigidly secured in, and projecting forwardly from, the board 11, the rear end of this rod forming a binding post. The frame 28 is provided with a rearwardly-extending contact-member 55 with which a contact 56 on the armature 33 cooperates, the contact 56 engaging with the contact 55 in the normal condition of the apparatus, and the armature 32 bearing against a block 32ª of insulating material on the yoke 28, in this condition of the apparatus.

The operation of the relay is as follows: When the relay coil 26 is energized both of the arms 32 and 33 rock in clockwise direction in Fig. 1 against the spring resistance referred to, the arm 33 disengaging from the contact 55. In this operation both of the arms 32 and 33 exert uniform downward pressure on the disk 50 at opposite sides of the rod 47 so that the normal position of this rod is not disturbed.

When the coil 26 becomes deenergized the arm 32 swings back to normal position but as the flux produced by the current in the shading coil 27 is out of the time phase with that produced by the current in the coil 26 this shading coil operates to cause the arm 33 to remain in the position to which it was operated by the energizing of the coil 26, so long as the current traverses the shading coil. The moment the arm 32 returns to normal position, as stated, the rod 47 by the action of the spring 51, swings to the left in Fig. 3 and the contacts 52 and 53 engage. As soon as current ceases to traverse the shading coil the contacts 52 and 53 disengage and the contacts 55 and 56 engage.

The provision of the relay thus constructed and operating as stated is of great value in controlling circuits, particularly when constituting one of the elements of the apparatus forming the subject of my co-pending, above-referred-to, application.

While I have illustrated and described a particular construction of relay embodying my invention, I do not wish to be understood as intending to limit it thereto as the construction shown may be variously modified and altered without departing from the spirit of my invention. Furthermore, while I have described my improved relay as forming an element of a particular construction of starting mechanism for an electric motor, I do not wish to be understood as intending to limit it to its use in this particular combination.

What I claim as new, and desire to secure by Letters Patent, is:

1. A relay comprising a plurality of independently movable armatures, a core equipped with a shading coil, said shading coil cooperating with one only of said armatures, means for energizing said core to attract both of said armatures, a contact-device formed of relatively movable elements, and means cooperating with said armatures and with the movable one of said elements for controlling the position of the movable one of said elements, said means including a tension device which is operated by both of said armatures, when the latter are drawn out of normal position, without affecting the normal condition of said contact device, but upon return of one of said armatures to normal condition while the other remains attracted by said shading coil, exerts its stored up energy on the movable element of said contact-device to move the latter relative to the other of said elements.

2. A relay comprising a plurality of independently pivoted armatures, a core equipped with a shading coil, said shading coil cooperating with one only of said armatures, means for energizing said core to attract both of said armatures, a contact-device one of the elements of which is pivotally mounted, and a spring bearing against said pivoted element, said armatures operating against said spring to place the latter under stress when both are attracted without affecting the condition of said contact-device, and said spring operating when one of said armatures returns to normal position while the other of said armatures remains attracted by said shading coil, to swing said pivoted contact-element relative to the other of said elements.

ROBERT W. COUSINS.